United States Patent
Brown et al.

[11] Patent Number: 5,890,123
[45] Date of Patent: Mar. 30, 1999

[54] SYSTEM AND METHOD FOR VOICE CONTROLLED VIDEO SCREEN DISPLAY

[75] Inventors: Michael Kenneth Brown, North Plainfield; Bruce Melvin Buntschuh, Berkeley Heights, both of N.J.

[73] Assignee: Lucent Technologies, Inc., Murray Hill, N.J.

[21] Appl. No.: 460,955

[22] Filed: Jun. 5, 1995

[51] Int. Cl.⁶ ............................................ G10L 7/08
[52] U.S. Cl. ............................... 704/275; 704/235
[58] Field of Search ............................. 395/2.44, 2.84, 395/2.79, 12, 2.4; 704/235, 231, 270, 272, 275, 9, 200

[56] References Cited

U.S. PATENT DOCUMENTS

| | | | |
|---|---|---|---|
| 4,677,569 | 6/1987 | Nakano et al. | 395/2.84 |
| 4,704,696 | 11/1987 | Reimer et al. | 395/2.84 |
| 4,726,065 | 2/1988 | Froessi | 395/2.84 |
| 4,776,016 | 10/1988 | Hansen | 395/2.84 |
| 5,036,439 | 7/1991 | Wrench et al. | 381/43 |
| 5,199,080 | 3/1993 | Kimura et al. | 395/2.84 |
| 5,303,148 | 4/1994 | Mattson et al. | 395/2.84 |
| 5,500,920 | 3/1996 | Kupiec | 395/2.79 |
| 5,510,981 | 4/1996 | Berger et al. | 395/2.86 |
| 5,519,809 | 5/1996 | Husseiny et al. | 395/2.84 |
| 5,557,539 | 9/1996 | Fitch | 364/514 B |

FOREIGN PATENT DOCUMENTS

| | | | |
|---|---|---|---|
| 0 016 314 A1 | 10/1980 | European Pat. Off. | A63F 9/22 |
| 543429-A2 | 11/1992 | European Pat. Off. | G10L 3/00 |
| WO 92/08531 | 5/1992 | WIPO | A63F 9/22 |
| WO 93/04748 | 3/1993 | WIPO | A63F 9/22 |

Primary Examiner—Richemond Dorvil

[57] ABSTRACT

A system and method for a voice controlled video screen display system are provided. The voice controlled system is useful for providing "hands-free" navigation through various video screen displays such as the World Wide Web network and interactive television displays. During operation of the system, language models are provided from incoming data in applications such as the World Wide Web network.

20 Claims, 2 Drawing Sheets

SYSTEM AND METHOD FOR VOICE CONTROLLED VIDEO SCREEN DISPLAY

BACKGROUND OF THE INVENTION

1. Field of the Invention

This invention relates generally to a system and method for providing a voice controlled video screen display, and more particularly to modifying existing systems to be voice interactive.

2. Background of the Related Art

As is well known, conventional methods for controlling video screen displays include use of a keyboard or "mouse" device. Other methods for controlling video screen displays include a sensor pad and hand-held pointing stylus, and light beams for effecting movement of a cursor on a display screen.

Conventional video screen display controlling devices generally require a fixed level surface and close proximity of the user to the display screen. Ample space for the controlling device, i.e., keyboard and/or mouse is also necessary.

Since all of the devices require manual dexterity, they are impractical devices for use by persons who are physically challenged, visually impaired, or have a limited range of movement due to arthritis, etc.

Various voice controlled video screen displays including speech recognition systems are well known in the art. See, for example, U.S. Pat. Nos. 5,345,538, 4,757,541, 4,633,499 and 4,158,750 the contents of which are incorporated herein by reference. However, the aforesaid prior art utilize voice controlled video screen display systems which incorporate speech recognizers that depend upon predefined and pre-stored languages. Therefore, the aforesaid prior art speech recognition systems have a significant shortcoming in that they are unable to be readily adapted to existing non-speech recognition systems so as to make such systems voice interactive. Thus, a voice controlled video screen display system is needed wherein the scope of the speech recognizable by the speech recognizer changes according to the user's operation of the system, as well as the system's operating program.

SUMMARY OF THE INVENTION

A system and method for a voice controlled video screen display are provided. Moreover, the present invention provides a system and method configured to be used in conjunction with an existing non-speech recognition formatted program so as to make it voice interactive through the recognition of key words (hereinafter referred to as "data links"). In particular, the voice controlled video screen display system of the present invention includes means for recognizing a set of data links which connect documents for display on a video screen. A compiler receives text from an interpreter and produces codes corresponding to a data link. The codes produced by the compiler are merged with finite operation commands to form a complete grammar for a speech recognizer. The compiler also produces vocabulary for translation by a translator into phonetic sequences. The phonetic sequences and complete grammar are then loaded into the speech recognizer which recognizes voiced utterances corresponding to the phonetic sequences and converts digitized speech into natural language text. The scope of the speech recognizable by the speech recognizer is dependent upon the user's operation of the system and the system's standard input devices.

An evaluator receives the natural language text from the speech recognizer, as well as codes from the interpreter and compiler, and produces programming commands for effecting the video screen display. Thus, the system and method of the present invention allow a user to obtain new video screen displays and effect screen display operations through voice control.

DETAILED DESCRIPTION OF PREFERRED EMBODIMENTS

Figure 1:
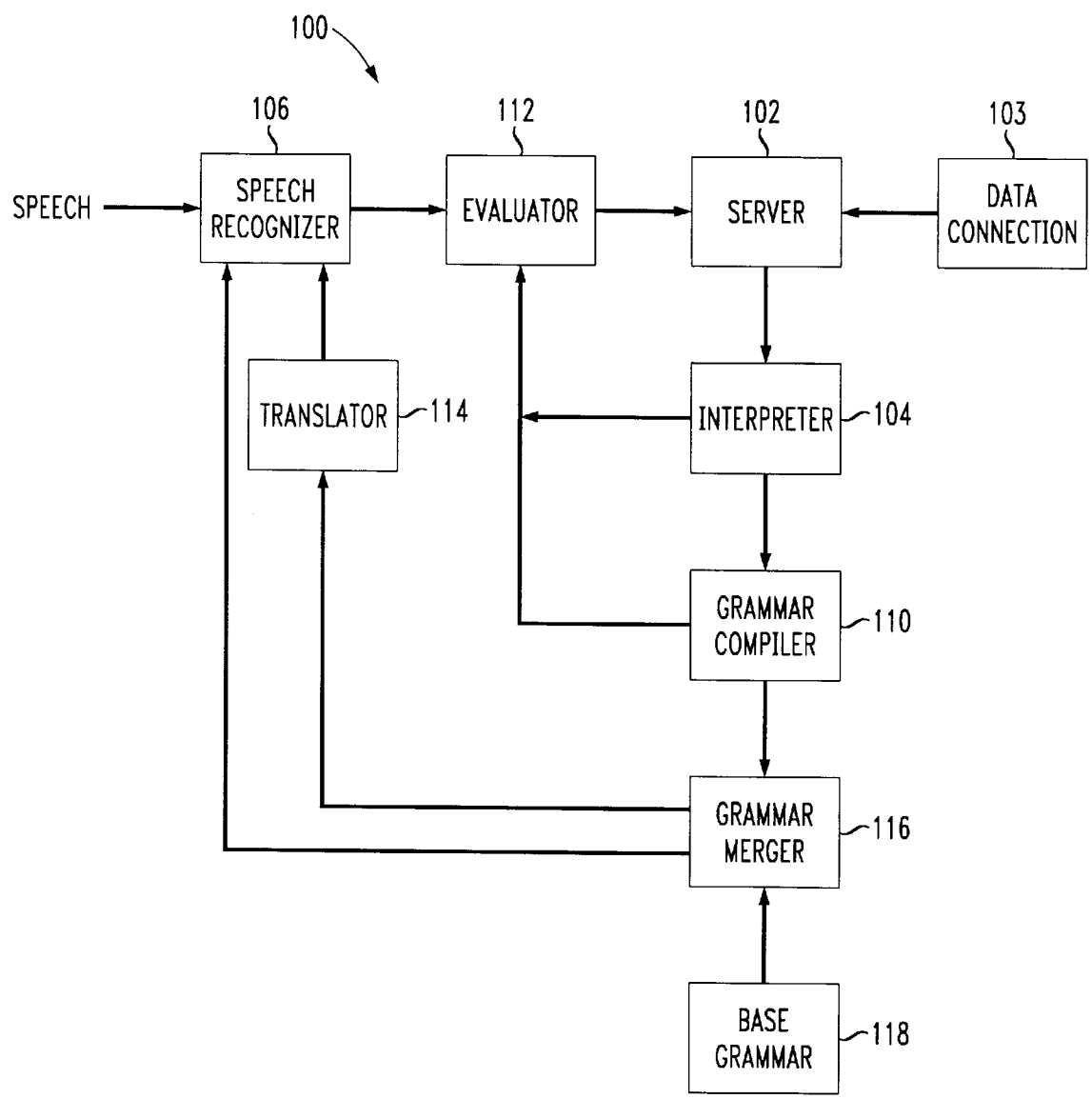
FIG. 1 is a block diagram generally depicting the voice controlled video screen display system in accordance with the present invention.

Referring now to the drawings, in which like reference numerals identify similar or identical elements, FIG. 1 illustrates a block diagram of the voice controlled video screen display system designated generally at 100. Voice controlled video screen display system 100 includes a server 102 for accessing documents from a data connection 103 and serving data to the other components of the voice controlled system. Examples of suitable data connections for use with the present invention include the Internet, local networks, modem connections, and cable television. The present invention is not limited to these data connections. Indeed, one skilled in the art can envision other data connections suitable for use with the system described herein.

A means for recognizing a set of data links (also known as "anchors" or "hot spots") identifies and interprets data links associated, i.e., operatively connected, with a video screen display. The set of data links can include data links which have not yet been established, for example, wherein the system is active but in an idle state. The means for recognizing a set of data links identifies and interprets the data links as they are received rather than merely retrieving prestored data. For example, the data links can be received from a server which tracks the video screen display. Alternatively the data links can be received from a user upon selection of a particular video screen display. Typically, data links connect files, documents, pages within documents, and portions of video screen displays thereby allowing a user to navigate through various screen displays with the use of a keyboard and/or mouse device. For example, the data links can be employed to navigate from one screen display to another or within a particular display, i.e., from one portion of a display to another. The data links are nonlinear and can interconnect in any conceivable way. The present invention employs these data links to achieve voice control of various video screen displays previously associated with non-speech recognition formats, such as the World Wide Web.

The means for recognizing data links is preferably an interpreter 104 which is operative to identify or derive the data links associated with a video screen display. The interpreter 104 then separates the data links into a first component that determines the location of the document such as, for example, a file name or pathname and a second component which provides grammar for a speech recognizer 106. Preferably, the interpreter is connected to server 102 through a software interface.

A grammar compiler 110 is preferably functionally connected to the interpreter 104 via a software interface. The grammar compiler 110 produces (a) codes corresponding to the data links wherein the codes are sent to an evaluator 112 which associates natural language text with codes such as file names to produce programming commands for the video screen display; (b) a finite state grammar for the speech recognizer 106; and (c) a vocabulary for translation by a translator 114 into phonetic sequences for the voice recognizer 106. One skilled in the art will readily appreciate that the terms interpreter, compiler and evaluator as used herein are interchangeable. The translator 114 can be a Text-to-Speech system, for example, as described in U.S. Pat. Nos. 4,685,135, 5,157,759 and 5,204,905 the contents of which are incorporated herein by reference. Alternatively, the translator 114 can be a lookup table.

In addition, the grammar compiler 110 is preferably functionally connected to a grammar merger 116 by methods well known in the art such as, for example, a software interface. The grammar merger 116 merges finite state grammar which constrains the language to be recognized by the speech recognizer 106 with static base grammars 118 for video screen display operations such as scrolling, pull-down menus, etc. Thus, the grammar merger 116 forms a complete grammar for input to the speech recognizer 106.

Voiced utterances are analyzed by the speech recognizer 106 which identifies speech corresponding to codes received from the grammar merger 116 and phonetic sequences received from the Text-to-Speech system. The voice recognizer 106 then converts the digitized speech into natural language text which is loaded into evaluator 112. The evaluator 112 associates the natural language text with the output of the interpreter to produce programming commands for the video screen display. Thus, when a user speaks, a new video screen display (or a different portion of a screen display) can be obtained or various screen display operations can be effected. In accordance with the method described herein the scope of the language recognizable by the speech recognizer 106 changes as the user navigates through screen displays. Since the system described herein recognizes and interprets data links as signals representative of particular portions of a video screen display are received, a large memory capacity for storing video screen display data is not required.

The present invention can be adapted to provide a variety of video screen display applications. For example, as is well known in the art, software termed a web browser for accessing and displaying the Internet's World Wide Web (WWW) network can be employed in accordance with the present invention to provide voice control for operation of the World Wide Web. Thus, a user can navigate through the World Wide Web without the use of a keyboard or mouse. However, it is to appreciated that implementation of the present invention voice controlled video screen display system 100 with the World Wide Web network as discussed hereinbelow is for illustrative and exemplary purposes only, as the present invention voice controlled video screen display may be implemented with numerous program applications.

Further, it is to be appreciated that the video screen display system 100 can also be adapted for use as an interactive television. As is known in the art, a hand-held device such as a cableless "mouse" can be modified to include a microphone for receiving speech to be processed by a speech recognizer. Preferably, the device is adapted to shut off the television audio when a user speaks into the microphone. Alternatively, a microphone can be mounted in any location which is convenient and accessible to the user such as a microphone mounted in the wall of a seating area.

In still another embodiment, the present invention can be employed to provide speaker verification or speaker identification features in conjunction with video screen displays. Speaker verification features check speech against stored acoustical patterns to provide security features for credit card use, etc. Speaker identification features analyze who is speaking and can be used to exclude particular speakers from gaining access to specific video screen display operations. A speech recognizer of the voice controlled system described herein can be trained to recognize an utterance of a particular user and to associate corresponding data link text with each utterance.

Figure 2:
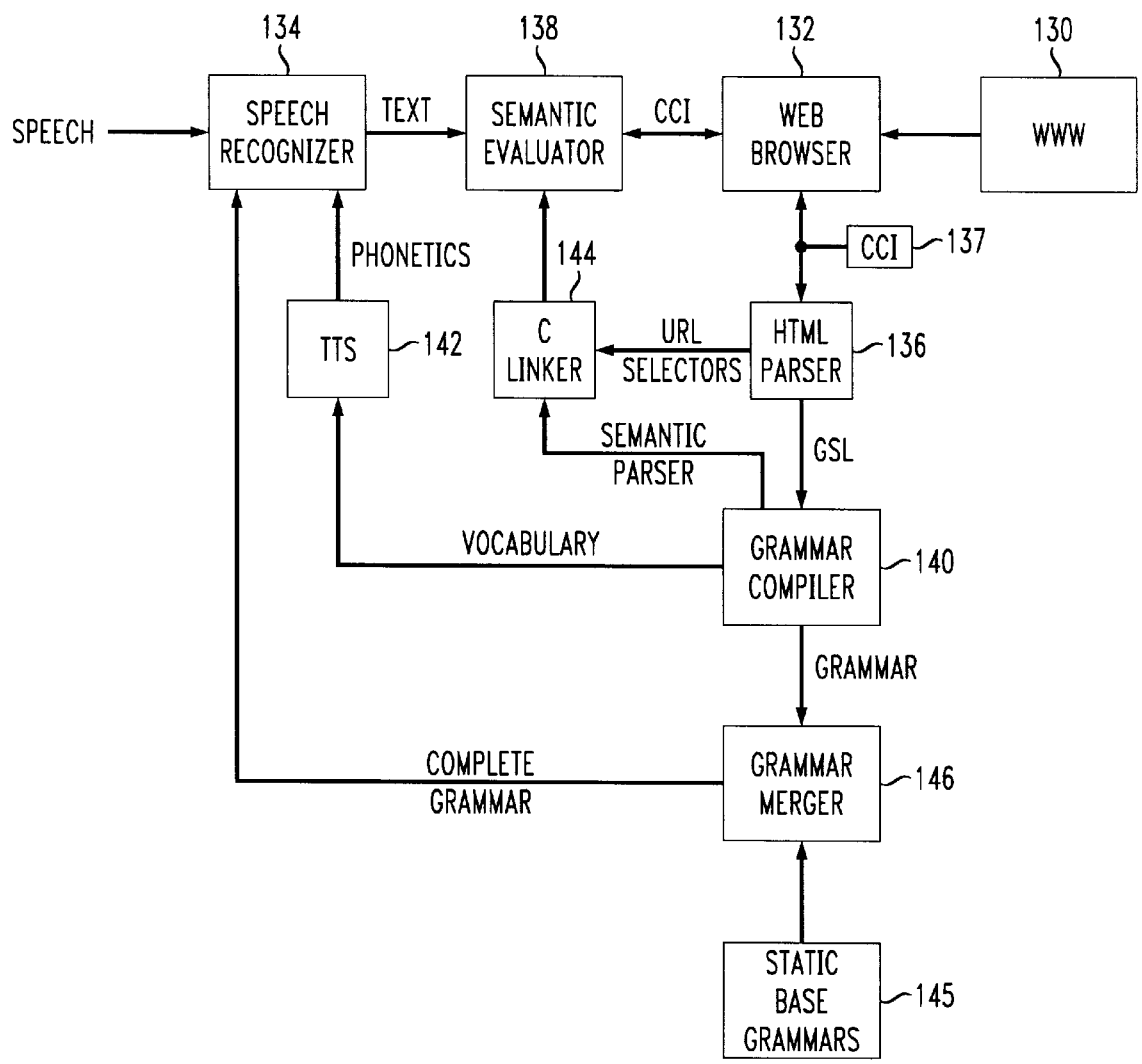
FIG. 2 is a block diagram depicting the video screen display system of FIG. 1 configured for use in conjunction with the World Wide Web network.

The foregoing features of the present invention will become more readily apparent and may be understood by referring to the following detailed description of an illustrative embodiment according to the present invention taken in conjunction with the accompanying drawing in which FIG. 2 is a block diagram illustrating a preferred embodiment of the present invention for use in providing voice control for the Internet's World Wide Web (WWW) network 130. This embodiment is provided for the purpose of illustrating a particular exemplification of the invention. As mentioned above, the present invention is not limited to this embodiment. Indeed, one skilled in the art can envision other applications for the voice controlled video screen display system described herein.

Web browser 132 is a software program and server which accesses the World Wide Web network 130. Web browsers are well known in the art, for example, Mosaic or Netscape are preferred web browsers for use with the present invention. Web browser 132 displays Hypertext Markup Language (HTML) which is the document formatting for use in reading the WWW system 130. Each HTML page of the WWW 130 includes special directives termed data links, "anchor" text, or "hot spots" which represent mouse sensitive or voice sensitive links to other HTML pages or elements of the WWW 130. As is well known, HTML is typically expressed as alphanumeric identifiers inside angle brackets which define fonts, graphics, headings, and links to other web sites.

A Speech Recognizer 134 recognizes speech corresponding to data links on a particular HTML page of the World Wide Web network 130. In accordance with the method described herein the scope of the words recognized by the Speech Recognizer 134 changes as a user employs speech to navigate from screen to screen, i.e., browsing the network. Thus, the present invention provides an Internet user with the ability to browse the WWW network 130 without a keyboard or mouse. Since the scope of the words recognizable by the Speech Recognizer changes according to the identification and interpretation of data links corresponding to a user's selection of particular pages rather than according to prestored and predefined language, the system described herein does not require memory capacity for all of the data links of the World Wide Web network.

With continued reference to FIG. 2, the system and process of the present invention will be described in greater detail. After the web browser 132 has received a HTML page from the WWW network 130, an HTML parser 136 opens a Common Client Interface (CCI) 137 connection to the web browser 132 to read and interpret the new HTML page. The new HTML page can correspond to a different screen display or a different portion of a screen display.

The HTML parser 136 interprets and processes a HTML page by dividing the data links into Uniform Resource Locators (URL) and text strings. The text strings are used to produce Grammar Specification Language (GSL) code which represents natural language for the speech recognizer.

The GSL is sent to the Grammar Compiler 140 which (a) provides a finite-state grammar which constrains or limits the language recognizable by the speech recognizer (b) produces code, preferably Yacc and Lex code, for the semantic parser component of a Semantic Evaluator 138 and (c) provides a vocabulary corresponding to the data link text which is processed through a Text-to-Speech System 142 to generate phonetic sequences or "phonemes" for transcription to the Speech Recognizer 134.

In a preferred embodiment of the present invention, C coded functions are formed from the URLs and are then sent from the HTML Parser 136 to a C Linker 144 which is a conventional C programming language object code linker. The C coded functions are then sent to the Semantic Evaluator 138. The C linker 144 combines the semantic parser code with URL selector code to produce a new context which represents a new HTML page. The new context replaces the old context or original semantic evaluator and receives text from the Speech Recognizer 134. It is to be understood, that the present invention is not limited to C programming language. Indeed, any other programming known in the art can be employed.

Finite-state HTML derived grammar produced by the Grammar Compiler 140 is combined with static base grammar by a Grammar Merger 146 to provide a complete new grammar, i.e., full language model, for the Speech Recognizer 134. The base grammars are the web browser control grammars which handle requests for window operations such as scrolling, pull-down menus, and moving forward and backward, etc. The base grammar is added to each new HTML derived grammar so that the web browser operations are always available to the user.

The Speech Recognizer 134 also receives phonetic sequences from the Text-to-Speech system 142. The Speech Recognizer 134 is preferably connected to the Semantic Evaluator 138 which associates data link text strings with URLs to obtain particular HTML pages from the WWW network 130. A UNIX pipe connection between the Speech Recognizer 134 and Semantic Evaluator 138 is preferred. Thus, the user can speak a command to control web browser window operations, such as, for example, scrolling, pull-down menus, etc. Alternatively, the user can speak a command corresponding to a data link which directs the web browser 130 to acquire the corresponding new HTML page. After the web browser 130 acquires the new HTML page, the HTML parser 136 processes the new HTML page by producing URL selector code and Grammar Specification Language (GSL) for the page. The process as described above is repeated allowing the user to browse the WWW network without a keyboard or mouse.

If desired, new voice controlled World Wide Web pages can be authored by formatting a document with appropriate Hypertext Markup Language and placing the document on a web server.

The voice controlled systems described herein are not intended to limit the invention to any particular embodiment. Modifications and variations of the present invention are possible in light of the above teachings. It is therefore to be understood that changes may be made in the particular embodiments of the invention described herein which are within the full intended scope of the invention as defined by the claims.

What is claimed is:

1. A voice-interactive video screen display system comprising:

means for recognizing a set of data links, each data link associated with visual information concurrently displayed on a video screen;

means for recognizing voiced utterances corresponding to the displayed visual information on said video screen and the associated data link, and generating corresponding natural language text, said visual information having been diplayed prior to the voiced utterances being spoken; and means for evaluating said natural language text and converting said natural language text to programming commands for changing the video screen display in accordance with said data link corresponding to said recognized voiced utterances.

2. A system according to claim 1, wherein said video screen display is selected from the group consisting of a computer monitor, a television screen, automatic teller machine screen and telephone screen display.

3. A system according to claim 1, wherein said data links include software text formatting directives.

4. A system according to claim 1, wherein said means for recognizing voiced utterances receives signals from a microphone positionable remote from a location of said system.

5. A system according to claim 1, wherein said means for recognizing data links interprets data links from software for accessing the World Wide Web network.

6. A system according to claim 1, wherein said means for recognizing data links interprets data links of at least one document displayed on said video screen display.

7. A system according to claim 1, wherein said means for recognizing data links interprets data links of at least one document stored in memory.

8. A system according to claim 1, wherein said programming commands produced by said means for evaluating natural language text direct the system to access a document for display on said video screen.

9. A device for accessing pages of a video screen display from a data connection comprising:

means for recognizing a set of data links, each associated with visual information concurrently displayed on at least a portion of a video screen display;

means for providing grammar corresponding to said data links of said video screen display;

means for recognizing speech and identifying whether the speech corresponds to said grammar associated with any one of said data links and th associated visual information already displayed; and means for transmitting a signal representative of a new video screen display if the speech corresponds to said any one data link, said new video screen display being associated with the one data link.

10. A device according to claim 9, wherein said means for recognizing a set of data links and said means for providing grammar corresponding to said data links are selected from the group consisting of a compiler, an interpreter and an evaluator.

11. A device according to claim 9, wherein said video screen display is selected from the group consisting of a computer monitor, a television screen, automatic teller machine screen and telephone screen display.

12. A device according to claim 9, wherein said data links include software text formatting directives.

13. A device according to claim 9, wherein said means for recognizing a set of data links interprets data links of software for accessing the World Wide Web network.

14. A device according to claim 9, wherein said means for recognizing a set of data links interprets data links of a document displayed on said video screen display.

15. A device according to claim 9, wherein said means for recognizing a set of data links interprets data links of at least one document stored in memory.

16. A method for accessing pages of a video screen display from a data connection comprising:

recognizing a set of data links, each associated with visual information concurrently displayed on at least a portion of a video screen display;

producing grammar corresponding to said data links of said video screen display;

recognizing speech and identifying whether the speech corresponds to said grammar associated with any one of said data links and the associated visual information already displayed; and if the speech corresponds to one of said data links, transmitting a signal representative of a new video screen display associated with the one data link.

17. A method according to claim 16, wherein said step of recognizing a set of data links includes accessing the World Wide Web network and interpreting data links of at least one document of the World Wide Web network.

18. A method according to claim 16, wherein said step of recognizing a set of data links includes interpreting data links displayed on a video screen.

19. A method according to claim 16, wherein said step of recognizing a set of data links includes interpreting data links of at least one document stored in memory.

20. A method according to claim 16, further including the steps of:

merging said grammar produced in said producing step with a base grammar associated with a portion of said video display;

said step of recognizing speech further including identifying whether said speech corresponds to either said base grammar or said produced grammar; and said step of transmitting further including transmitting a signal representative of a new video screen display associated with said base grammar if said speech corresponds to said base grammar.

* * * * *